US012796858B2

(12) United States Patent
Johnson

(10) Patent No.: US 12,796,858 B2
(45) Date of Patent: Nov. 17, 2026

(54) OVEN APPLIANCE AND METHODS FOR BROILING OR HIGH-HEAT COOKING

(71) Applicant: Haier US Appliance Solutions, Inc., Wilmington, DE (US)

(72) Inventor: Eric Scott Johnson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1177 days.

(21) Appl. No.: 17/682,357

(22) Filed: Feb. 28, 2022

(65) Prior Publication Data

US 2023/0270284 A1 Aug. 31, 2023

(51) Int. Cl.

| | |
|---|---|
| ***A47J 36/32*** | (2006.01) |
| ***A47J 37/06*** | (2006.01) |
| ***F24C 3/12*** | (2006.01) |
| ***F24C 7/08*** | (2006.01) |

(52) U.S. Cl.

CPC ............... *A47J 36/32* (2013.01); *A47J 37/06* (2013.01); *F24C 3/128* (2013.01); *F24C 7/087* (2013.01); *A47J 2202/00* (2013.01)

(58) Field of Classification Search

CPC ........ A47J 36/32; A47J 37/06; A47J 2202/00; F24C 3/128; F24C 7/087

USPC ............................................................ 99/331

See application file for complete search history.

(56) References Cited

U.S. PATENT DOCUMENTS

| | | | |
|---|---|---|---|
| 3,358,122 A | 12/1967 | Torrey | |
| 4,865,010 A | 9/1989 | Kett | |
| 5,695,668 A | 12/1997 | Boddy | |
| 6,104,005 A | 8/2000 | Adamski et al. | |
| 6,337,468 B1 | 1/2002 | Worthington et al. | |
| 6,570,136 B1 * | 5/2003 | Lockwood ............. | F24C 7/082 219/412 |
| 6,734,403 B2 | 5/2004 | Baker et al. | |
| 6,758,206 B1 | 7/2004 | Barnes | |

(Continued)

FOREIGN PATENT DOCUMENTS

| | | |
|---|---|---|
| CN | 104767768 A | 7/2015 |
| CN | 204795645 U | 11/2015 |

(Continued)

*Primary Examiner* — Topaz L. Elliott

*Assistant Examiner* — Daniel Ward Hatten

(74) *Attorney, Agent, or Firm* — Dority & Manning, P.A.

(57) ABSTRACT

An oven appliance may include a cabinet, a plurality of chamber walls, a top heating element, an oven temperature sensor, and a controller. The plurality of chamber walls may define a cooking chamber. The oven temperature sensor may be disposed within the cabinet to detect a temperature within the cooking chamber. The controller may be configured to initiate a cooking operation that includes directing initial activation of the top heating element according to an initial offset temperature threshold, detecting a first temperature value at the oven temperature sensor that is greater than the initial offset temperature threshold, reducing heat output at the top heating element in response to detecting the first temperature value, and directing, following reducing heat output, reactivation of the top heating element according to a predetermined maximum threshold at the oven temperature sensor, the predetermined maximum threshold being distinct from the initial offset threshold.

14 Claims, 8 Drawing Sheets

(56) References Cited

U.S. PATENT DOCUMENTS

| | | | |
|---|---|---|---|
| 6,777,652 | B2 | 8/2004 | Stockley |
| 6,831,255 | B1 | 12/2004 | Levi et al. |
| 6,943,321 | B2 | 9/2005 | Brekken |
| 6,987,252 | B2 | 1/2006 | Goodrich |
| 7,378,617 | B1 | 5/2008 | Brockman |
| 8,049,142 | B2 | 11/2011 | Blackson |
| 8,269,151 | B2 | 9/2012 | Klasmeier et al. |
| 8,304,695 | B2 | 11/2012 | Bonuso et al. |
| 9,930,897 | B2 | 4/2018 | Blue et al. |
| 9,995,492 | B2 | 6/2018 | Adelmann |
| 10,012,392 | B2 | 7/2018 | Froelicher et al. |
| 10,082,297 | B2 | 9/2018 | Kim |
| 10,314,433 | B1 | 6/2019 | Knight |
| 10,448,457 | B2 | 10/2019 | Armstrong |
| 10,502,430 | B1 | 12/2019 | Alvey |
| 10,520,199 | B2 | 12/2019 | Polster |
| 10,677,472 | B2 | 6/2020 | Johnson et al. |
| 10,753,621 | B2 | 8/2020 | Johnson |
| 10,895,385 | B2 | 1/2021 | Otsuki et al. |
| 2004/0149722 | A1 | 8/2004 | Schnell et al. |
| 2009/0136640 | A1* | 5/2009 | Embury .................... A23L 5/13 426/510 |
| 2014/0130684 | A1 | 5/2014 | Reese et al. |
| 2014/0360387 | A1 | 12/2014 | Bogdon |
| 2015/0208669 | A1 | 7/2015 | Cavalcanti |
| 2016/0040892 | A1 | 2/2016 | Wiseman et al. |
| 2016/0220057 | A1* | 8/2016 | Smith .................. H05B 3/0076 |
| 2016/0378082 | A1 | 12/2016 | Fisher et al. |
| 2017/0089590 | A1 | 3/2017 | Bruin-Slot et al. |
| 2017/0130968 | A1 | 5/2017 | Nagraj |
| 2018/0003390 | A1 | 1/2018 | Trice et al. |
| 2018/0020680 | A1 | 1/2018 | Froelicher et al. |
| 2018/0159958 | A1 | 6/2018 | Lederer |
| 2019/0327795 | A1 | 10/2019 | Hannah et al. |
| 2020/0166217 | A1 | 5/2020 | Smith et al. |
| 2021/0404745 | A1* | 12/2021 | Johnson ................... A21B 1/40 |
| 2022/0117238 | A1* | 4/2022 | Paller ...................... F24C 7/085 |
| 2022/0308537 | A1* | 9/2022 | Neal ....................... F24C 15/00 |

FOREIGN PATENT DOCUMENTS

| | | | |
|---|---|---|---|
| CN | 111145284 | A | 5/2020 |
| EP | 0579917 | A2 | 1/1994 |
| EP | 2251609 | | 8/2017 |
| EP | 2251609 | B1 | 8/2017 |
| JP | H07280281 | A | 10/1995 |
| JP | 2010112664 | A | 5/2010 |
| JP | 2016217609 | A | 12/2016 |
| KR | 100821731 | B1 | 4/2008 |

* cited by examiner

OVEN APPLIANCE AND METHODS FOR BROILING OR HIGH-HEAT COOKING

FIELD OF THE INVENTION

The present subject matter relates generally to oven appliances, and more particularly, to methods of operating an oven appliance for broiling or high-heat cooking.

BACKGROUND OF THE INVENTION

Conventional residential and commercial oven appliances generally include a cabinet that includes a cooking chamber for receipt of food items for cooking. Multiple gas or electric heating elements are positioned within the cabinet for heating the cooking chamber to cook food items located therein. The heating elements can include, for example, a bake heating assembly positioned at a bottom of the cooking chamber and a separate broiler heating assembly positioned at a top of the cooking chamber.

Typically, food or utensils for cooking are placed on wire racks within the cooking chamber and below the broiler heating assembly. Certain food items, such as pizzas or breads, may benefit from very high, localized (i.e., non-diffuse) heat from the boiler heating assembly. Often, the broiler heating assembly is selectively activated to achieve a set temperature within the cooking chamber, which may be indirectly measured by a dedicated temperature sensor. Such measurements are indirect because the temperatures detected at the temperature sensor are usually correlated to, but do not equal, temperature within the middle of the cooking chamber.

Difficulties may arise in executing broiling or high-heat operations. Moreover, the correlation between the temperature detected at the temperature sensor and the actual temperature within the middle cooking chamber may become disrupted. This can be especially true at high temperatures or conditions in which the broiler heater assembly has been activated for extended periods of time (e.g., in order to perform multiple cooking cycles or otherwise cook multiple food items in quick succession). Inadequate or lengthy cooking operations may fail to deliver sufficient heat from a broiler heater assembly before one or more temperature sensors signal the broiler heater assembly to deactivate.

Accordingly, it would be advantageous to provide an oven appliance or methods for consistently or accurately heating an oven appliance. Additionally or alternatively, it would be advantageous to provide consistent delivery of high-intensity heat (e.g., from an upper portion of a cooking chamber) without overcooking certain food items or overheating other portions of the cooking chamber.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an oven appliance is provided. The oven appliance may include a cabinet, a plurality of chamber walls, a top heating element, an oven temperature sensor, and a controller. The plurality of chamber walls may be mounted within the cabinet. The plurality of chamber walls may define a cooking chamber. The plurality of chamber walls may include a back wall, a top wall, a first side wall, a second side wall, and a bottom wall. The top heating element may be mounted within the cooking chamber. The oven temperature sensor may be disposed within the cabinet to detect a temperature within the cooking chamber. The controller may be in operative communication with the top heating element and the oven temperature sensor. The controller may be configured to initiate a cooking operation that includes directing initial activation of the top heating element according to an initial offset temperature threshold, detecting a first temperature value at the oven temperature sensor that is greater than the initial offset temperature threshold, reducing heat output at the top heating element in response to detecting the first temperature value, and directing, following reducing heat output, reactivation of the top heating element according to a predetermined maximum threshold at the oven temperature sensor, the predetermined maximum threshold being distinct from the initial offset threshold.

In another exemplary aspect of the present disclosure, a method of operating oven appliance is provided. The method may include directing initial activation of a top heating element according to an initial offset temperature threshold and detecting a first temperature value at an oven temperature sensor that is greater than the initial offset temperature threshold. The method may also include reducing heat output at the top heating element in response to detecting the first temperature value and directing, following reducing heat output, reactivation of the top heating element according to a predetermined maximum threshold at the oven temperature sensor, the predetermined maximum threshold being distinct from the initial offset threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
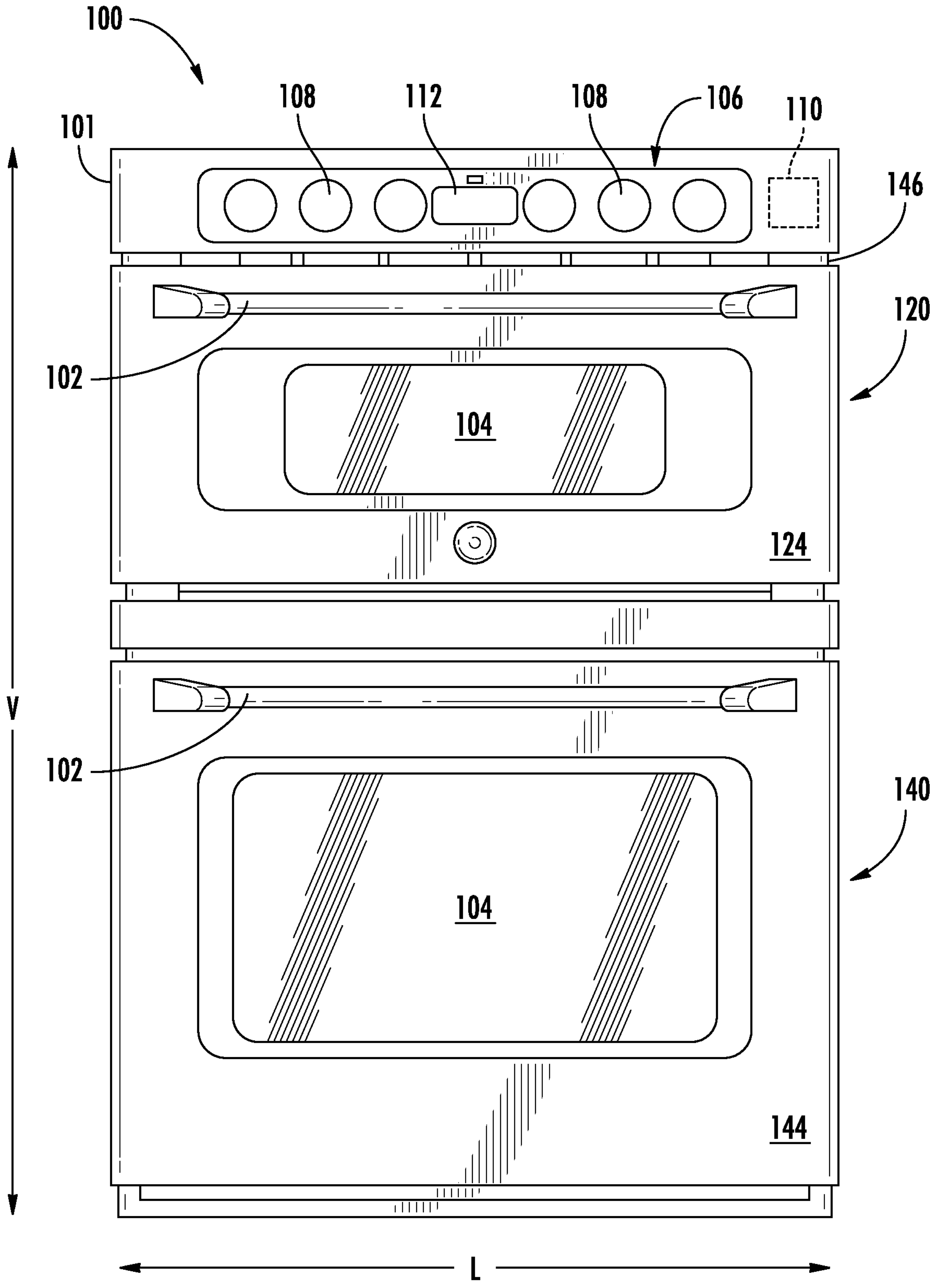
FIG. 1 provides an elevation view of an oven appliance according to exemplary embodiments of the present disclosure.
Figure 2:
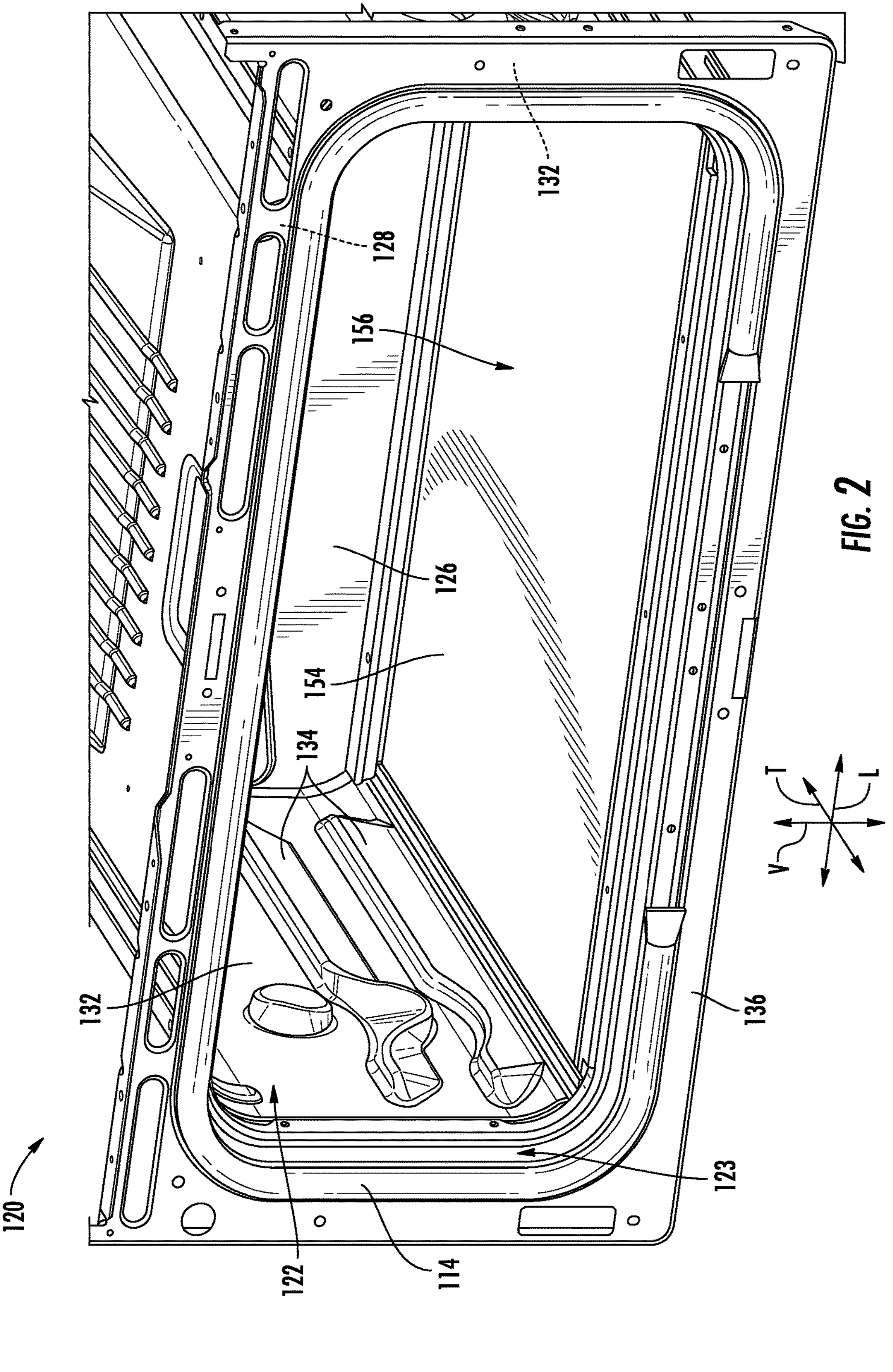
FIG. 2 provides a perspective view of an upper cooking chamber of the exemplary oven appliance of FIG. 1.
Figure 3:
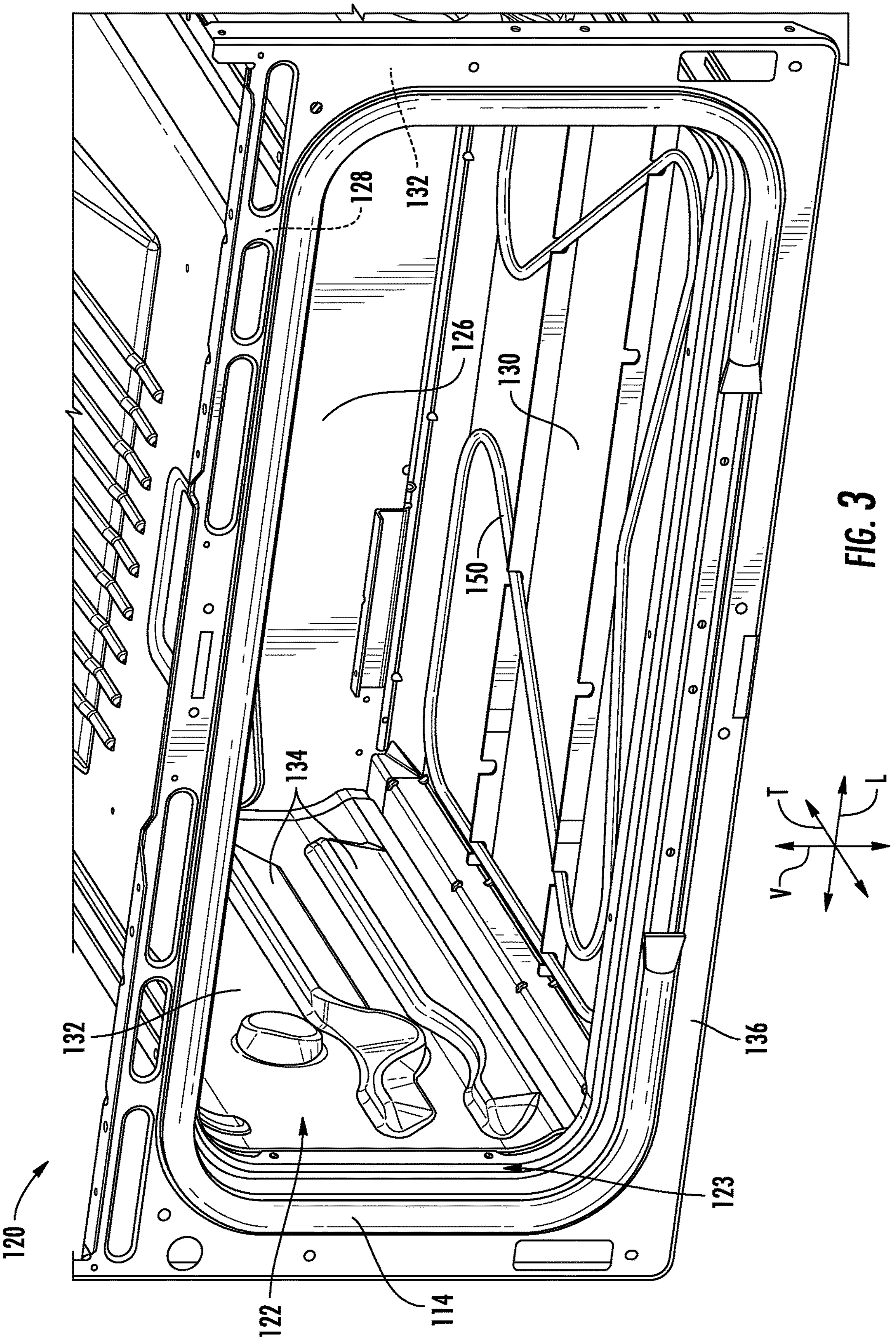
FIG. 3 provides another perspective view of the upper cooking chamber of the exemplary oven appliance of FIG. 1, wherein a cooking plate has been omitted for clarity.
Figure 4:
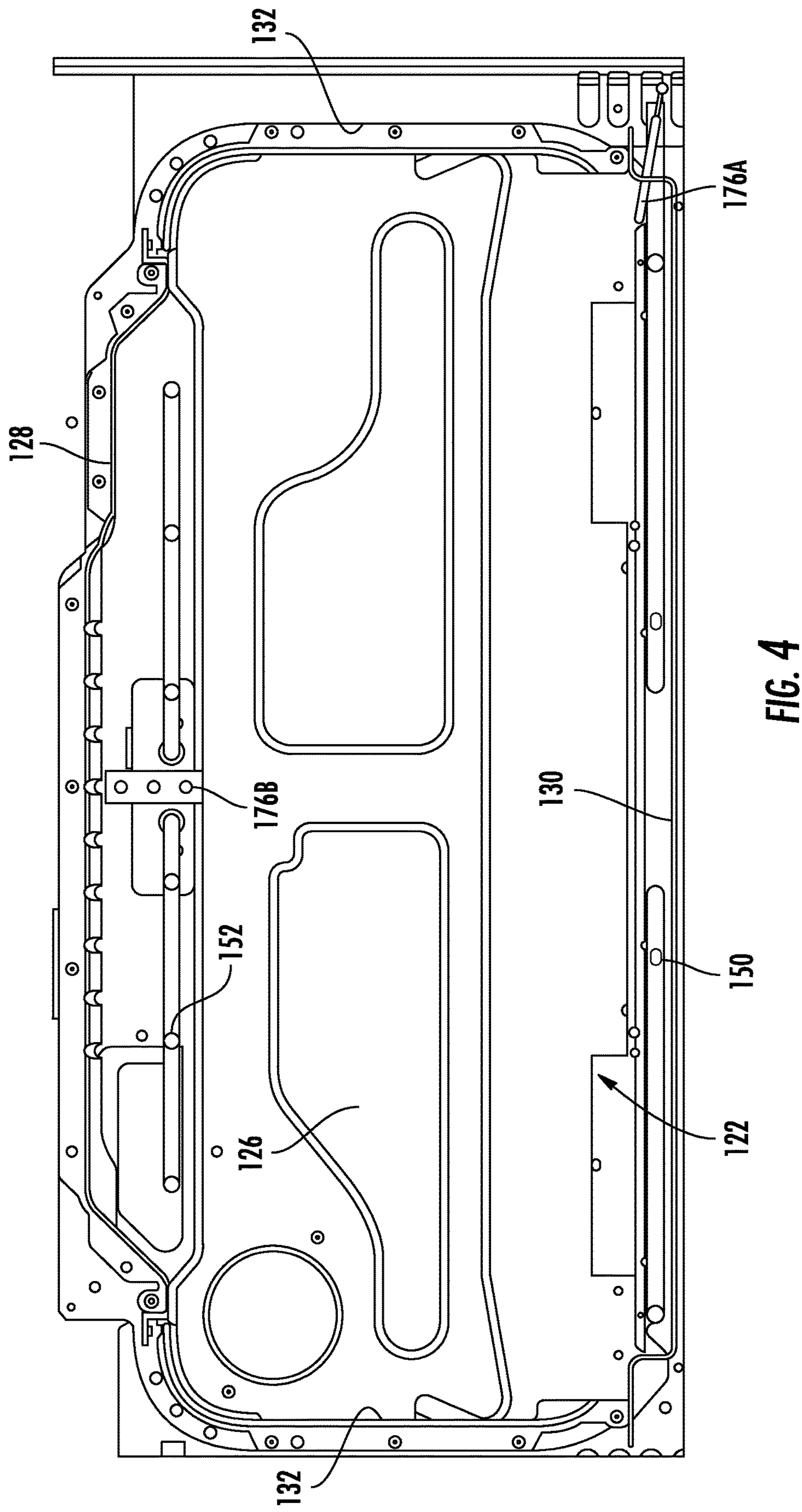
FIG. 4 provides an elevation view of the exemplary upper cooking chamber of FIG. 3.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "coupled," "fixed," "attached to," and the like refer to both direct coupling, fixing, or attaching, as well as indirect coupling, fixing, or attaching through one or more intermediate components or features, unless otherwise specified herein.

Referring now to the drawings, FIG. 1 illustrates an exemplary embodiment of a double oven appliance 100 according to the present disclosure.

Although aspects of the present subject matter are described herein in the context of a double oven appliance 100, it should be appreciated that oven appliance 100 is provided by way of example only. Other oven or range appliances having different configurations, different appearances, or different features may also be utilized with the present subject matter as well (e.g., single ovens, electric cooktop ovens, induction cooktops ovens, etc.).

Generally, oven appliance 100 has a cabinet 101 that defines a vertical direction V, a longitudinal direction L and a transverse direction T. The vertical, longitudinal and transverse directions are mutually perpendicular and form an orthogonal direction system. In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 101 does not necessarily require an enclosure and may simply include open structure supporting various elements of appliance 100. By contrast, cabinet 101 may enclose some or all portions of an interior of cabinet 101. It should be appreciated that cabinet 101 may have any suitable size, shape, and configuration while remaining within the scope of the present subject matter.

Double oven appliance 100 includes an upper oven 120 and a lower oven 140 positioned below upper oven 120 along the vertical direction V. Upper and lower ovens 120 and 140 include oven or cooking chambers 122 and 142, respectively, configured for the receipt of one or more food items to be cooked. Specifically, cabinet 101 defines a respective opening for each cooking chamber 122 and 142. For instance, an upper opening 123 may be defined (e.g., along the transverse direction T) to access upper cooking chamber 122.

Double oven appliance 100 includes an upper door 124 and a lower door 144 in order to permit selective access to cooking chambers 122 and 142, respectively (e.g., via the corresponding opening). Handles 102 are mounted to upper and lower doors 124 and 144 to assist a user with opening and closing doors 124 and 144 in order to access cooking chambers 122 and 142. As an example, a user can pull on handle 102 mounted to upper door 124 to open or close upper door 124 and access cooking chamber 122. Glass window panes 104 provide for viewing the contents of cooking chambers 122 and 142 when doors 124, 144 are closed and also assist with insulating cooking chambers 122 and 142. Optionally, a seal or gasket (e.g., gasket 114) extends between each door 124, 144 and cabinet 101 (e.g., when the corresponding door 124 or 144 is in the closed position). Such gasket may assist with maintaining heat and cooking fumes within the corresponding cooking chamber 122 or 142 when the door 124 or 144 is in the closed position. Moreover, heating elements, such as electric resistance heating elements, gas burners, microwave elements, etc., are positioned within upper and lower oven 120 and 140.

A control panel 106 of double oven appliance 100 provides selections for user manipulation of the operation of double oven appliance 100. For example, a user can touch control panel 106 to trigger one of user inputs 108. In response to user manipulation of user inputs 108, various components of the double oven appliance 100 can be operated. Control panel 106 may also include a display 112, such as a digital display, operable to display various parameters (e.g., temperature, time, cooking cycle, etc.) of the double oven appliance 100.

Figure 5:
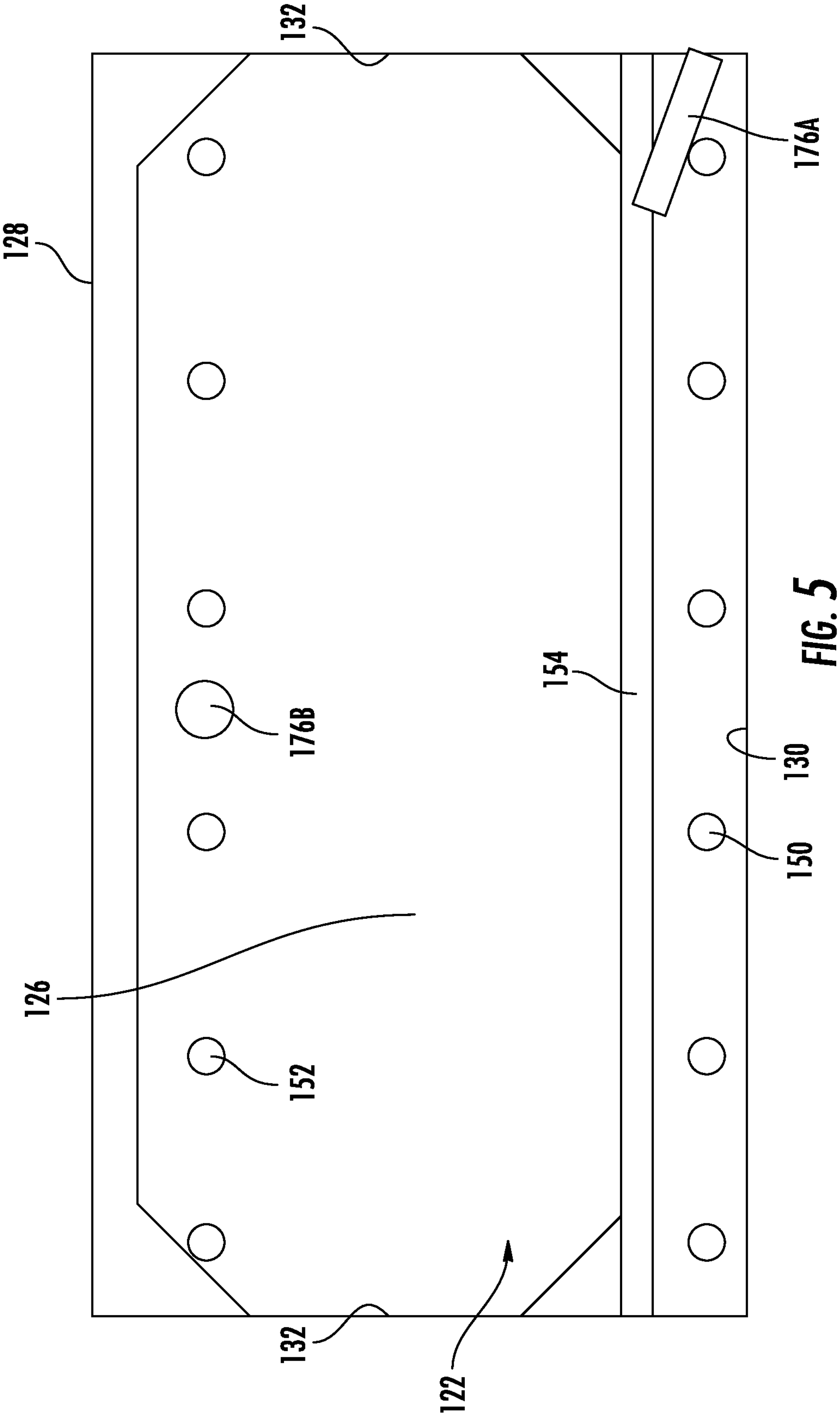
FIG. 5 provides a schematic elevation view of the upper cooking chamber of the exemplary oven appliance of FIG. 1.

Generally, oven appliance 100 may include a controller 110 in operative communication (e.g., operably coupled via a wired or wireless channel) with control panel 106. Control panel 106 of oven appliance 100 may be in communication with controller 110 via, for example, one or more signal lines or shared communication busses, and signals generated in controller 110 operate oven appliance 100 in response to user input via user input devices 108. Input/Output ("I/O") signals may be routed between controller 110 and various operational components of oven appliance 100 such that operation of oven appliance 100 can be regulated by controller 110. In addition, controller 110 may also be in communication with one or more sensors, such as a first temperature sensor (TS1) (i.e., plate temperature sensor) 176A or a second temperature sensor (TS2) (i.e., oven temperature sensor) 176B (FIG. 5). Generally, either or both TS1 176A and TS2 176B may include or be provided as a thermistor or thermocouple, which may be used to measure temperature at a location proximate to upper cooking chamber 122 and provide such measurements to the controller 110. Although TS1 176A is illustrated as a probe extending proximate to or above bottom heating element 150 (e.g., to or below a cooking plate 154) and TS2 176B is illustrated proximate to or below top heating element 152 (e.g., above ribs 134 or cooking plate 154), it should be appreciated that other sensor types, positions, and configurations may be used according to alternative embodiments. It is further noted that although two discrete temperature sensors 176A and 176B are shown, both sensors are not required for exemplary embodiments of the present disclosure. For instance, certain embodiments may only include a single temperature sensor (e.g., 176B) without requiring the other (e.g., 176A).

Controller 110 is a "processing device" or "controller" and may be embodied as described herein. Controller 110 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 110 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 110 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Turning now to FIGS. 2 through 5, various views are provided illustrating, in particular, upper cooking chamber 122 of upper oven 120. As shown, upper cooking chamber 122 is generally defined by a back wall 126, a top wall 128 and a bottom wall 130 spaced from top wall 128 along the vertical direction V by opposing side walls 132 (e.g., a first wall and a second wall). Optionally, a front plate 136 may be attached to the walls to define the upper opening 123. For instance, front plate 136 may extend along bottom wall 130, top wall 128, and the opposing side walls 132 about upper opening 123. In turn, gasket 114 may be mounted on or engaged with front plate 136 (e.g., when the corresponding upper door is closed). In some embodiments opposing side walls 132 include embossed ribs 134 such that a baking rack defining a cooking or support surface and containing food items may be slidably received onto embossed ribs 134 and may be moved into and out of upper cooking chamber 122 when door 124 is open. Optionally, such walls 126, 128, 130, 132 may be included within an outer casing 146 of cabinet 101, as is understood. It is noted that a solid cooking plate 154 defining a non-permeable cooking surface 156 is illustrated in various figures (e.g., FIGS. 2 and 5). Nonetheless, it is understood that alternative embodiments may be provided without such a plate and may include, for instance, a bottom cooking element 150 or bottom wall 130 that is exposed to the rest of the cooking chamber 122 (e.g., similar to the depictions provided in FIGS. 3 and 4).

As shown, upper oven includes one or more heating elements to heat upper cooking chamber 122 (e.g., as directed by controller 110 as part of a cooking operation). For instance, a bottom heating element 150 may be mounted at a bottom portion of upper cooking chamber 122 (e.g., above bottom wall 130). Additionally or alternatively, a top heating element 152 may be mounted at a top portion of upper cooking chamber 122 (e.g., below top wall 128). Bottom heating element 150 and top heating element 152 may be used independently or simultaneously to heat upper cooking chamber 122, perform a baking or broil operation, perform a cleaning cycle, etc.

The heating elements 150, 152 may be provided as any suitable heater for generating heat within upper cooking chamber 122. For instance, either heating element may include an electric heating element (e.g., resistance wire elements, radiant heating element, electric tubular heater or CALROD®, halogen heating element, etc.). Additionally or alternatively, either heating element may include a gas burner.

Additionally or alternatively, one or more temperature sensors (e.g., TS2 176B) may be provided proximal to the top wall 128 (i.e., distal to bottom wall 130) in or otherwise within thermal communication with cooking chamber 122, for instance, to detect the temperature of top heating element 152 or cooking chamber 122, generally. Optionally, TS2 176B may be mounted between the top wall 128 and bottom wall 130. In some embodiments, TS2 176B is mounted at or below heating element 152. Specifically, TS2 176B may be laterally positioned between the side walls 132 (e.g., at substantially the lateral middle of cooking chamber 122). As an example, TS2 176B may be connected to or otherwise supported on back wall 126 (e.g., via a mechanical fastener, clip, or hook).

When assembled, the temperature sensor(s) 176A or 176B may be operably coupled to controller 110. Moreover, the controller 110 may be configured to control top heating element 152 or bottom heating element 150 based on one or more temperatures detected at the temperature sensor(s) 176A or 176B (e.g., as part of a cooking operation). In some embodiments, a cooking operation initiated by the controller 110 may thus include detecting one or more temperatures of TS1 176A or TS2 176B, and directing heat output from (e.g., a heat setting of) top heating element 152 or bottom heating element 150 based on the detected temperature(s).

Figure 6:
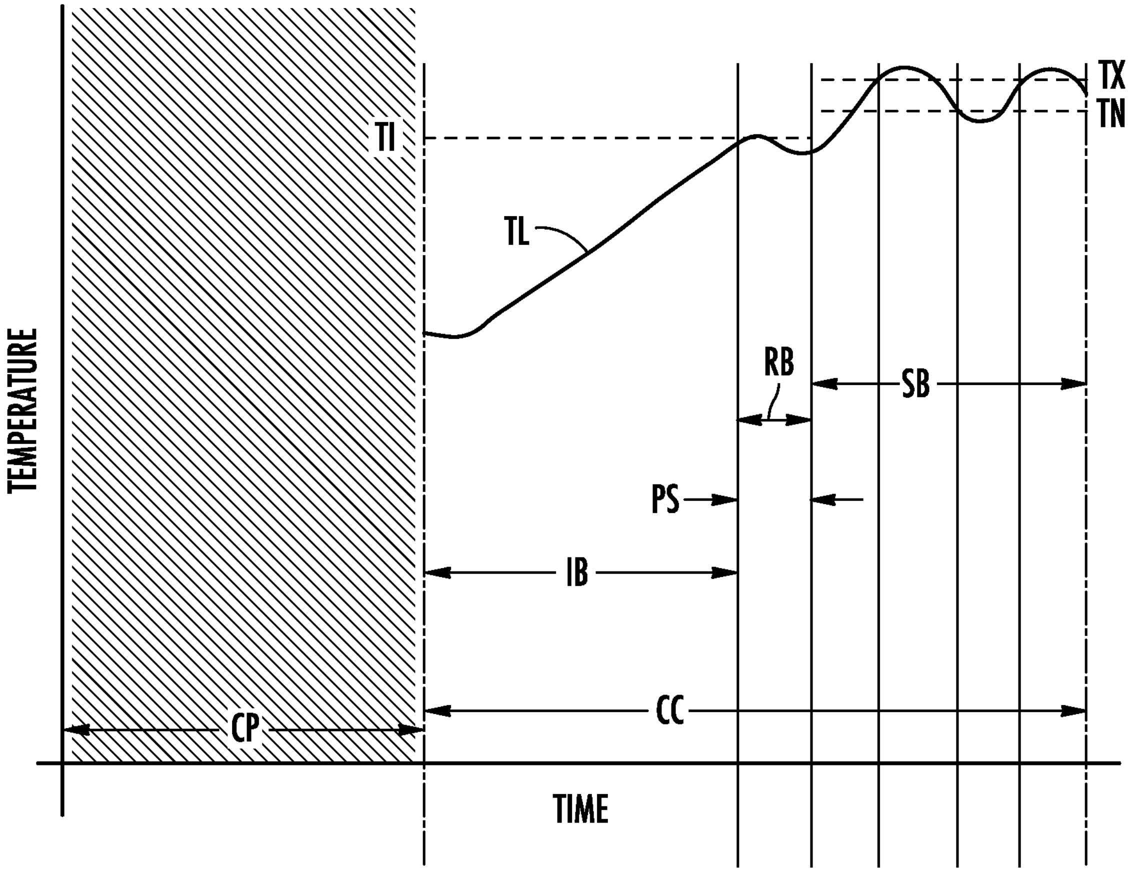
FIG. 6 is a graph view illustrating a temperature over time for an oven temperature sensor within an oven appliance during a cooking operation according to exemplary embodiments of the present disclosure.
Figure 7:
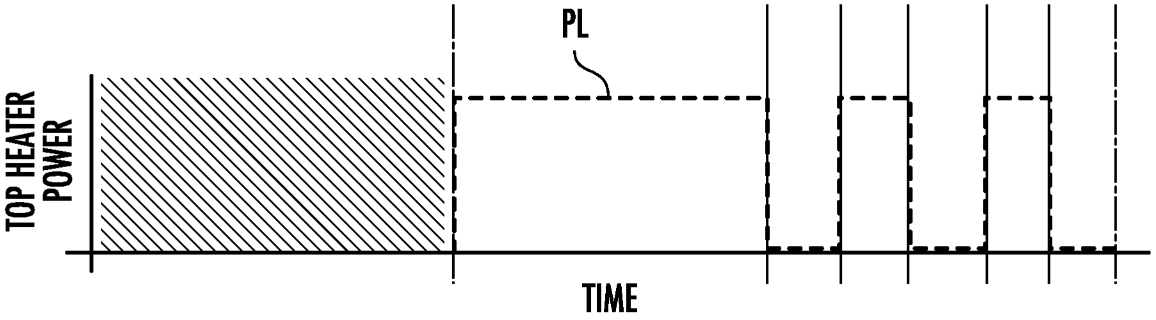
FIG. 7 is a graph view illustrating power output over time for a top heater within an oven appliance during the exemplary cooking operation of FIG. 6.

As an example, and turning briefly to FIGS. 6 and 7, graphs are provided to illustrate a cooking operation directed by controller 110 (FIG. 1) in operative communication with at least the heating element 152 (FIG. 5) and temperature sensor 176B (FIG. 5). In particular, FIG. 6 provides a graph of temperature line TL detected at TS2 176B. FIG. 7 provides a graph of output line PL for power output (e.g., as dictated by a duty cycle) at top heating element 152. Although the illustrated power output line PL illustrate the binary active-inactive states of a duty cycle, substitution may be made of a duty cycle for a TRIAC-regulated power cycle wherein power output is directed as a percentage of maximum power output, as would be understood.

As generally indicated, the cooking operation may include a preheat phase CP in which the top heating element or the bottom heating element is/are directed according to a heating (e.g., preheating) cycle. Such a preheating cycle may include activating (i.e., preheat activation of) one or more heating elements and be conditioned on, for instance, reaching a predetermined preheat threshold or expiration of a set preheat time. Exemplary preheat phases or preheating cycles prior to a cooking cycle may generally be understood and need not be described in greater detail herein. Moreover, it is understood that, except as otherwise indicated, a preheat phase is not required according to exemplary embodiments of the present disclosure.

A cooking phase CC may be initiated (e.g., automatically following a preheat phase or in response to a user input to indicate start of the cooking phase). Upon initiating the cooking phase, a first heating (e.g., initial broil) cycle IB is started. Specifically, the top heating element 152 may be activated according to the first heating cycle IB. The first heating cycle may include, for instance, a first duty cycle or heat output (e.g., heat output setting) for the top heating element 152. Thus, activation of the top heating element may be directed to the first heat output. In the illustrated embodiments, the first heat output is a high heat output, such as 100% or a duty cycle wherein the top heating element 152 is maintained at a continuous active state for the duration of the first heating cycle IB. An initial offset threshold TI may be included with the first heating cycle IB. Thus, the first heating cycle IB or activation of the top heating element 152 may continue until the initial offset threshold TI is exceeded. In turn, activation of the top heating element 152 during the first heating cycle IB may be according to the initial offset temperature threshold TI.

Following the first heating cycle IB (e.g., in response to detecting a temperature value that is greater than the initial offset threshold TI), a reduced cooling cycle RB is started. In the reduced cooling cycle RB, the heat output of the top heating element 152 is generally reduced. Thus, the heat output at PL may be less in the reduced cooling cycle RB than the first heating cycle IB. Optionally, activation of top heating element or the heat output PL may be restricted/reduced to 0, such that the top heating element 152 is held in an inactive state for the duration of reduced cooling cycle RB.

The reduced cooling cycle RB may continue until one or more predicate conditions are met. Thus, in some embodiments, the top heating element 152 is held in an inactive state until one or more (e.g., some or, alternatively, all) of the predicate conditions are met. One predicate condition may be expiration of a set time period PS. The set time period PS (i.e., the countdown thereof) may start simultaneously with and in response to the start of the reduced cooling cycle RB. Thus, the predicate condition of the set time period PS may ensure that the reduced cooling cycle RB continues for at least the length of the set time period PS. An additional or alternative predicate condition may be tied to temperature TL. For instance, a predicate condition may be that temperature TL be less than a predetermined minimum threshold (i.e., predetermined minimum temperature threshold) TN. As shown, the predetermined minimum threshold TN may be less than a predetermined maximum threshold (i.e., predetermined maximum temperature threshold) TX. Optionally, the predetermined minimum threshold TN may be greater than the initial offset threshold TI.

Following the reduced cooling cycle RB (e.g., in response to one or more or all of the predicate conditions being met), a second heating (e.g., steady broil) cycle SB is started. Specifically, the top heating element 152 may be reactivated according to the second heating cycle SB. The second heating cycle SB may include, for instance, a second duty cycle or heat output (e.g., low output setting) for the top heating element 152. Thus, activation (i.e., reactivation) of the top heating element may be directed to the second heat output (e.g., less than the first heat output). Optionally, the second heat output may be less than the first heat output. In other words, the active time of the duty cycle or percentage of power output for the second heat output may be less than the first heat output. Alternatively, the second heat output may be equal to the first heat output.

A predetermined maximum threshold TX (e.g., oven temperature value selected by a user or set by a fixed value from the user-selected value) that is greater than the initial offset threshold TI may be included with the second heating cycle SB. Thus, activation of the top heating element 152 may continue until the predetermined maximum threshold TX is exceeded. Upon being exceeded, the second heating cycle SB may (e.g., temporarily) restrict or halt top power output PL. In turn, activation of the top heating element 152 during the second heating cycle SB may be according to the predetermined maximum threshold TX. Along with the predetermined maximum threshold TX, a predetermined minimum threshold TN (e.g., oven temperature value selected by a user or set by a fixed value from the user-selected value), which is less than the predetermined maximum threshold TX, may be provided. Specifically, the predetermined minimum threshold TN may set a baseline for activation of top heating element 152. For instance, upon falling below the predetermined minimum threshold, the second heating cycle SB may increase power output PL (e.g., to the second duty cycle or heat output). In turn, activation of the top heating element 152 during the second heating cycle SB may be further according to the predetermined minimum threshold TN.

As would be understood in light of the present disclosure, the second heating cycle SB may continue to cycle (increase-decrease heat generation at) the top heating element between the predetermined minimum and maximums TX and TN, for instance, until a user-selected endpoint (e.g., time limit for the cooking phase CC or a general input indicating a new temperature for the cooking chamber or an end to cooking operations altogether). It is noted that although a thermostatic range is illustrated in FIG. 6 (e.g., between TX and TN), one of ordinary skill, in light of the present disclosure, will understand that a Proportional-Integral-Derivative (PID) control scheme may be employed to control the output of the bottom heating element 150 or the top heating element 152 based on how far the bottom and oven temperatures, respectively, are from a predetermined set point or threshold.

Advantageously, the cooking chamber 122 may be maintained at a desired temperature or range (e.g., without being excessively heated), and may ensure extended heat generation at the top heating element (e.g., without overheating other portions of the cooking chamber 122).

Figure 8:
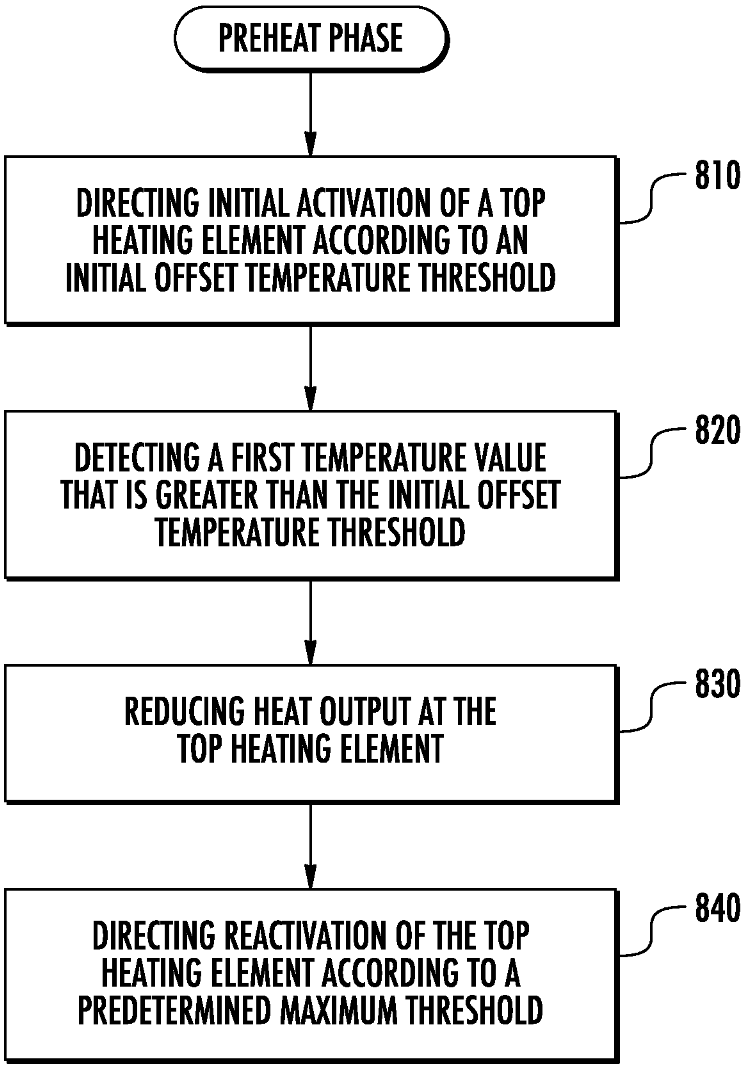
FIG. 8 is a flow chart illustrating of method of operating an oven appliance according to exemplary embodiments of the present disclosure.
Figure 9:
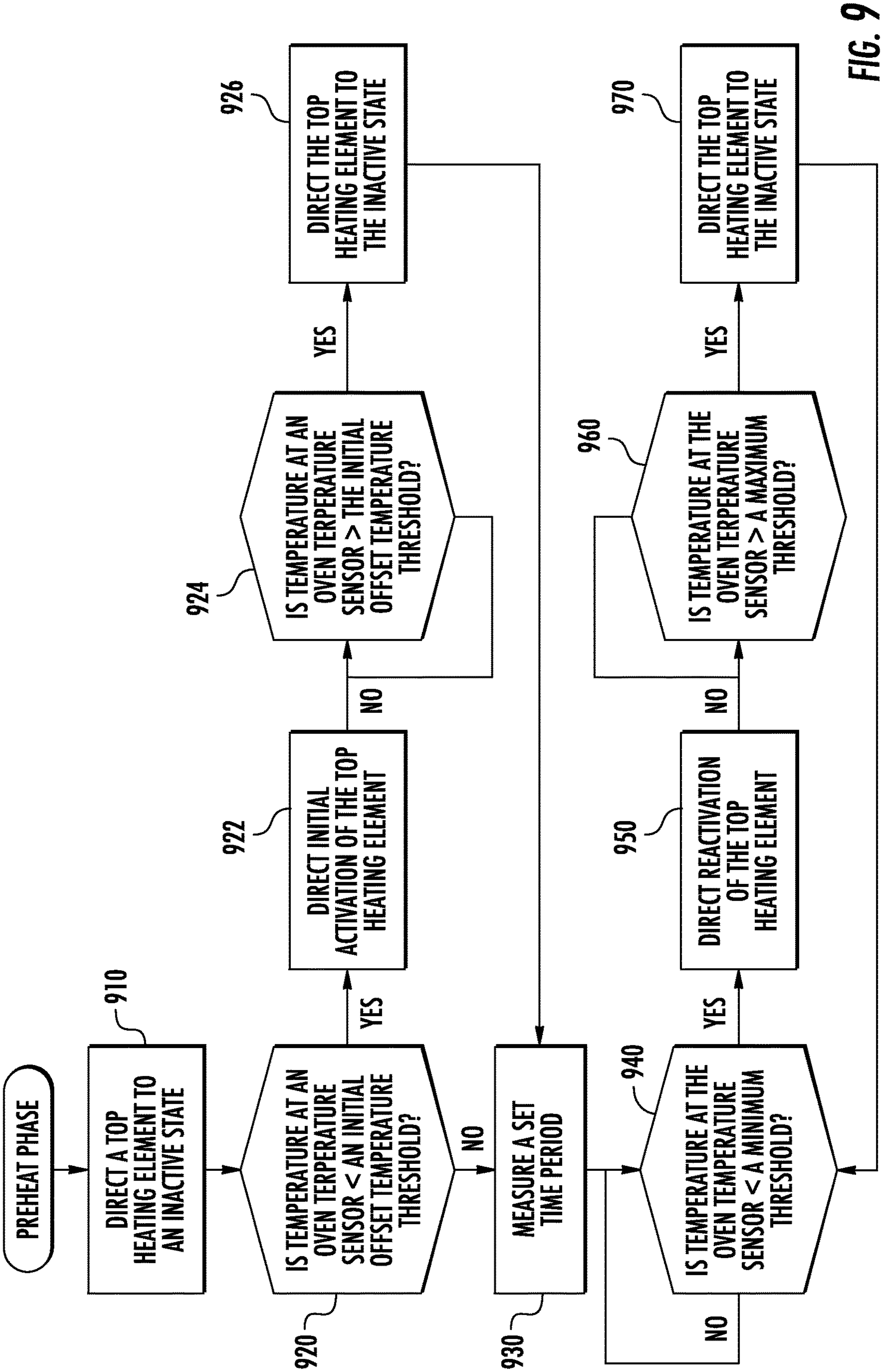
FIG. 9 is a flow chart illustrating of method of operating an oven appliance according to exemplary embodiments of the present disclosure.

Referring now to FIGS. 8 and 9, the present disclosure may further be directed to methods (e.g., method 800 or 900) of operating an oven appliance, such as appliance 100. In exemplary embodiments, the controller 110 may be operable to perform various steps of a method in accordance with the present disclosure.

The methods (e.g., 800 or 900) may occur as, or as part of, a cooking operation (e.g., short-cycle cooking operation) of oven appliance 100. In particular, the methods (e.g., 800 or 900) disclosed herein may advantageously facilitate a cooking chamber to be brought to a temperature (e.g., selected by a user) consistently or accurately. Additionally or alternatively, the methods (e.g., 800 or 900) may advantageously permit extended heat generation at the top heating element (e.g., without excessively heating the cooking chamber generally).

It is noted that the order of steps within methods 800 or 900 are for illustrative purposes. Moreover, none of the methods 800 or 900 are mutually exclusive. In other words, methods within the present disclosure may include one or more of methods 800 or 900. All may be adopted or characterized as being fulfilled in a common operation. Except as otherwise indicated, one or more steps in the below method 800 or 900 may be changed, rearranged, performed in a different order, or otherwise modified without deviating from the scope of the present disclosure.

Turning especially to FIG. 8, at 810, the method 800 includes directing initial activation of the top heating element. In particular, initial activation is directed according to an initial offset temperature threshold. The initial activation may include a first heat output (e.g., setting) at which the top heating element is activated. In turn, 810 may provide for heat generation at the top heating element based on the first heat output (e.g., duty cycle or percentage of power output) in order to meet the target of the initial offset temperature threshold.

As would be understood, the method 800 may include a preheating cycle such that the top heating element is directed to preheat activation according to the preheating cycle prior to 810. Thus, the initial activation may be subsequent to the preheating cycle and the preheat activation thereof.

In some embodiments, the initial offset temperature threshold represents an upper limit for initial activation. Thus, 810 may include activating the top heating element at a set power output until the first temperature value is detected. Optionally, the initial offset temperature threshold may be set by a fixed relationship (e.g., fixed value or difference) from a user-selected value (e.g., for the cooking chamber). Thus, the exact value of the initial offset temperature may be determined by applying (e.g., adding or subtracting) a constant temperature offset value to the user-selected value.

At 820, the method 800 includes detecting a first temperature value at the oven temperature sensor (e.g., while the top heating element is active) that is greater than the initial offset temperature threshold. As would be understood, the oven temperature sensor may repeatedly or constantly detect temperature values (e.g., at a fixed rate or schedule) during 810. Such detected temperature values may then be compared to the initial offset temperature threshold. Thus, at 820, the method 800 may generally determine when the temperature within the cooking chamber exceeds the initial offset temperature value. Additionally or alternatively, the first heat output at 810 may be maintained, for instance, until the initial offset temperature threshold is exceeded at 820.

At 830, the method 800 includes reducing heat output at the top heating element. Specifically, 830 may be in response to detecting the first temperature value at 820. Reducing heat output (e.g., from the set or first power output) may include deactivating the top heating element and maintaining it in the inactive (i.e., deactivated) state. Thus, 830 may include holding the top heating element in an inactive state.

As noted above in the examples of FIGS. 6 and 7, reduction of heat output at 830 may continue until one or more (e.g., all of the) predicate conditions are met. Again, such predicate conditions may include a set time period. Thus, 830 may continue for the set time period (e.g., until the set time period expires following the start of 830). Additionally or alternatively, such predicate conditions may include a predetermined minimum threshold. Thus, 830 may continue at least until temperature (e.g., measured at the oven temperature sensor) is detected as being below the predetermined minimum threshold. Optionally, the predetermined minimum threshold may be set by a fixed relationship (e.g., fixed value or difference) from a user-selected value (e.g., for the cooking chamber). Thus, the exact value of the predetermined minimum threshold may be determined by applying (e.g., adding or subtracting) a constant temperature offset value to the user-selected value. In some embodiments, the predetermined minimum threshold is greater than the initial offset threshold.

At 840, the method 800 includes directing reactivation of the top heating element according to a predetermined maximum threshold (e.g., at the oven temperature sensor). The reactivation may include a second heat output (e.g., setting) at which the top heating element is activated. In turn, 840 may provide for heat generation at the top heating element based on the second heat output (e.g., duty cycle or percentage of power output) in order to meet the target of the predetermined maximum threshold.

Generally, 840 is understood to follow 830. Moreover, the predetermined maximum threshold may be distinct from the initial offset threshold. Optionally, the predetermined maximum threshold may be set by a fixed relationship (e.g., fixed value or difference) from a user-selected value (e.g., for the cooking chamber). Thus, the exact value of the predetermined maximum threshold may be determined by applying (e.g., adding or subtracting) a constant temperature offset value to the user-selected value. In some embodiments, the predetermined maximum threshold is greater than the initial offset threshold.

As noted above, in addition to the predetermined maximum threshold, a predetermined minimum threshold below the maximum threshold may be provided (e.g., such that the top heating element is cycled to generally maintain a temperature at the oven sensor that is between the predetermined maximum and minimum thresholds). Thus, 840 may further include directing reactivation according to the predetermined minimum threshold.

Generally, 840 may continue until a set condition is met, such as expiration of a predetermined time interval, reaching a predetermined temperature, receiving a user input, or determining some intervening event has occurred.

Turning now to FIG. 9, at 910, the method 900 includes directing the top heating element to an inactive state following an optional preheat phase (e.g., as would be understood in light of the present disclosure). Thus, the top heating element may be deactivated until one or more determinations may be made (e.g., at 920).

At 920, the method 900 includes evaluating a temperature at the oven temperature sensor. Specifically, an oven temperature signal (e.g., first oven temperature signal) may be received from the oven temperature sensor, as would be understood and generally described above. Using the oven temperature signal, a measurement or reading of temperature at the oven temperature sensor may be obtained. Once obtained, the measured oven temperature may be compared an initial offset temperature threshold (e.g., set as constant temperature offset value to the user-selected value). If the temperature is determined not to be less than the initial offset temperature threshold, the method 900 may proceed to 930. If the temperature is determined to be less than the initial offset temperature threshold, the method 900 may proceed to 922.

At 922, the method 900 include directing initial activation of the top heating element. The initial activation may include a first heat output (e.g., setting) at which the top heating element is activated. In turn, 922 may provide for heat generation at the top heating element based on the first heat output (e.g., duty cycle or percentage of power output) in order to meet the target of the initial offset temperature threshold.

After starting the initial activation of the top heating element at 922, the method 900 may proceed to 924 (e.g., while continuing to direct the activation of the top heating element).

At 924, the method 900 includes reevaluating the oven temperature. Specifically, a new (e.g., second) oven temperature signal may be received from the oven temperature sensor, as would be understood and generally described above. Using the new or second oven temperature signal, a measurement or reading of temperature at the oven temperature sensor may be obtained. Once obtained, the new or second measured oven temperature may be compared to the initial offset temperature threshold. If the second measured temperature is determined not to exceed the initial offset temperature threshold, the method 900 may repeat 924 (e.g., while 922 continues). By contrast, if the new or second temperature is determined to exceed the initial offset temperature threshold, the method 900 may proceed to 926.

At 926, the method 900 includes directing the top heating element to an inactive state following 924. Thus, following 922 and 924, the top heating element may be deactivated while the method 900 proceeds to 930.

At 930, the method 900 includes measuring a set time period (e.g., rest period). The rest period generally follows a period of deactivation and begins its measurement (e.g., countdown) simultaneously with deactivation. Thus, 930 ensures the top heating element remains in the inactive state for at least the duration of the set time period (e.g., as a predicate condition) before proceeding to 940.

At 940, the method 900 includes reevaluating the oven temperature. Specifically, a new (e.g., third) oven temperature signal may be received from the oven temperature sensor, as would be understood and generally described above. Using the new or third oven temperature signal, a measurement or reading of temperature at the oven temperature sensor may be obtained. Once obtained, the new or third measured oven temperature may be compared to a predetermined minimum threshold (e.g., as described above). If the third oven temperature is determined not to be less than the predetermined minimum threshold, the method 900 may repeat 940 (e.g., while continuing to maintain the top heating element in the inactive state). By contrast, if the new or third temperature is determined to be less than the predetermined minimum temperature threshold (e.g., as a predicate condition), the method 900 may proceed to 950.

At 950, the method 900 includes directing reactivation of the top heating element. The reactivation may include a second heat output (e.g., setting) at which the top heating element is activated. In turn, 950 may provide for heat generation at the top heating element based on the second heat output (e.g., duty cycle or percentage of power output).

After starting the reactivation of the top heating element at 950, the method 900 may proceed to 960 (e.g., while continuing to direct the activation of the top heating element).

At 960, the method 900 includes reevaluating the oven temperature. Specifically, a new (e.g., fourth) oven temperature signal may be received from the oven temperature sensor, as would be understood and generally described above. Using the new or fourth oven temperature signal, a measurement or reading of temperature at the oven temperature sensor may be obtained. Once obtained, the new or fourth oven temperature may be compared to the predetermined maximum threshold. If the fourth measured oven temperature is determined not to exceed the predetermined maximum threshold, the method 900 may repeat 960 (e.g., while 950 continues). By contrast, if the new or fourth temperature is determined to exceed the predetermined maximum temperature threshold, the method 900 may proceed to 970.

At 970, the method 900 includes directing the top heating element to an inactive state following 960. Thus, following 950 and 960, the top heating element may be deactivated while the method 900 returns to 940.

Thus, steps 940 through 970 may generally repeat as the cooking operation continues until a set condition is met, such as expiration of a predetermined time interval, reaching a predetermined temperature, receiving a user input, or determining some intervening event has occurred.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance comprising:

a cabinet;

a plurality of chamber walls mounted within the cabinet, the plurality of chamber walls defining a cooking chamber, the plurality of chamber walls comprising a back wall, a top wall, a first side wall, a second side wall, and a bottom wall;

a top heating element mounted within the cooking chamber;

a bottom heating element mounted within the cooking chamber below the top heating element;

an oven temperature sensor disposed within the cabinet to detect a temperature within the cooking chamber; and a controller in operative communication with the top heating element and the oven temperature sensor, the controller being configured to initiate a cooking operation comprising directing a preheating cycle from an unheated state of the cooking chamber in which the top heating element and the bottom heating element are in an inactive state, wherein directing the preheating cycle comprises directing the top heating element or the bottom heating element to an active state, directing, subsequent to the preheating cycle, initial activation of the top heating element at a first heat output according to an initial offset temperature threshold, the initial activation of the top heating element being the first activation of the top heating element following the preheating cycle, detecting a first temperature value at the oven temperature sensor that is greater than the initial offset temperature threshold, reducing heat output at the top heating element in response to detecting the first temperature value, wherein reducing heat output comprises holding the top heating element in the inactive state, and directing, following reducing heat output, reactivation of the top heating element at a second heat output according to a predetermined maximum threshold at the oven temperature sensor, the predetermined maximum threshold being distinct from the initial offset threshold, and the second heat output being less than or equal to the first heat output.

2. The oven appliance of claim 1, wherein the predetermined maximum threshold is greater than the initial offset temperature threshold.

3. The oven appliance of claim 1, wherein directing reactivation is further according to a predetermined minimum threshold, the predetermined minimum threshold being less than the predetermined maximum threshold.

4. The oven appliance of claim 3, wherein the predetermined minimum threshold is greater than the initial offset threshold.

5. The oven appliance of claim 1, wherein holding the top heating element in the inactive state continues for a set time period.

6. The oven appliance of claim 1, wherein directing reactivation of the top heating element is conditioned on temperature at the oven temperature sensor being less than a predetermined minimum threshold, the predetermined minimum threshold being less than the predetermined maximum threshold.

7. The oven appliance of claim 1, wherein directing initial activation comprises activating the top heating element at a set power output until the first temperature value is detected.

8. A method of operating an oven appliance comprising a plurality of chamber walls mounted within a cabinet and defining a cooking chamber, a top heating element mounted within the cooking chamber, a bottom heating element mounted within the cooking chamber below the top heating element, and a controller, the method comprising:

directing a preheating cycle from an unheated state of the cooking chamber in which the top heating element and the bottom heating element are in an inactive state, wherein directing the preheating cycle comprises directing the top heating element or the bottom heating element to an active state;

directing, subsequent to the preheating cycle, initial activation of the top heating element at a first heat output according to an initial offset temperature threshold, the initial activation of the top heating element being the first activation of the top heating element following the preheating cycle;

detecting a first temperature value at an oven temperature sensor that is greater than the initial offset temperature threshold;

reducing heat output at the top heating element in response to detecting the first temperature value, wherein reducing heat output comprises holding the top heating element in the inactive state; and directing, following reducing heat output, reactivation of the top heating element at a second heat output according to a predetermined maximum threshold at the oven temperature sensor, the predetermined maximum threshold being distinct from the initial offset threshold, and the second heat output being less than or equal to the first heat output.

9. The method of claim 8, wherein the predetermined maximum threshold is greater than the initial offset temperature threshold.

10. The method of claim 8, wherein directing reactivation is further according to a predetermined minimum threshold, the predetermined minimum threshold being less than the predetermined maximum threshold.

11. The method of claim 10, wherein the predetermined minimum threshold is greater than the initial offset threshold.

12. The method of claim 8, wherein holding the top heating element in the inactive state continues for a set time period.

13. The method of claim 8, wherein directing reactivation of the top heating element is conditioned on temperature at the oven temperature sensor being less than a predetermined minimum threshold, the predetermined minimum threshold being less than the predetermined maximum threshold.

14. The method of claim 8, wherein directing initial activation comprises activating the top heating element at a set power output until the first temperature value is detected.

* * * * *